(12) United States Patent
Anguelov et al.

(10) Patent No.: US 11,915,490 B2
(45) Date of Patent: Feb. 27, 2024

(54) ANNOTATED SURFEL MAPS

(71) Applicant: Waymo LLC, Mountain View, CA (US)

(72) Inventors: Dragomir Anguelov, San Francisco, CA (US); Colin Andrew Braley, Mountain View, CA (US); Christoph Sprunk, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/819,883

(22) Filed: Aug. 15, 2022

(65) Prior Publication Data

US 2023/0076479 A1    Mar. 9, 2023

Related U.S. Application Data

(63) Continuation of application No. 17/015,809, filed on Sep. 9, 2020, now Pat. No. 11,417,110.

(51) Int. Cl.
*G06V 20/56* (2022.01)
*G06F 18/214* (2023.01)
*G06F 18/2415* (2023.01)

(52) U.S. Cl.
CPC ............ *G06V 20/56* (2022.01); *G06F 18/214* (2023.01); *G06F 18/2415* (2023.01)

(58) Field of Classification Search
CPC .... G06V 20/56; G06F 18/214; G06F 18/2415
See application file for complete search history.

(56) References Cited

U.S. PATENT DOCUMENTS

| 2017/0248963 A1 | 8/2017 | Levinson et al. |
| 2018/0364717 A1 | 12/2018 | Douillard et al. |
| 2019/0026943 A1* | 1/2019 | Yan .......................... G06T 7/344 |

(Continued)

FOREIGN PATENT DOCUMENTS

WO    WO 2017/220966    12/2017

OTHER PUBLICATIONS

Behley et al., "Efficient Surfel-Based SLAM using 3D Laser Range Data in Urban Environments," Robotics: Science and Systems, 2018, 10 pages.

(Continued)

*Primary Examiner* — Myron Wyche
(74) *Attorney, Agent, or Firm* — Fish & Richardson P.C.

(57) ABSTRACT

Methods, systems, and apparatus, including computer programs encoded on computer storage media, for the generation and use of a surfel map with semantic labels. One of the methods includes receiving a surfel map that includes a plurality of surfels, wherein each surfel has associated data that includes one or more semantic labels; obtaining sensor data for one or more locations in the environment, the sensor data having been captured by one or more sensors of a first vehicle; determining one or more surfels corresponding to the one or more locations of the obtained sensor data; identifying one or more semantic labels for the one or more surfels corresponding to the one or more locations of the obtained sensor data; and performing, for each surfel corresponding to the one or more locations of the obtained sensor data, a label-specific detection process for the surfel.

21 Claims, 4 Drawing Sheets

(56) References Cited

U.S. PATENT DOCUMENTS

| | | | |
|---|---|---|---|
| 2019/0147220 A1* | 5/2019 | McCormac | G06F 18/2415 382/103 |
| 2019/0278292 A1 | 9/2019 | Levinson et al. | |
| 2019/0339361 A1 | 11/2019 | Fechner et al. | |
| 2020/0080848 A1* | 3/2020 | Sprague | G01C 21/206 |
| 2020/0257900 A1 | 8/2020 | Dubroy et al. | |

OTHER PUBLICATIONS

International Search Report and Written Opinion in International Appln. No. PCT/US2021/043138, dated Nov. 16, 2021, 20 pages.

Park et al., "Probabilistic Surfel Fusion for Dense LiDAR Mapping," Proceedings of the IEEE International Conference on Computer Vision, 2017, pp. 2418-2426.

Pfister et al., "Surfels: surface elements as rendering primitives," Proceedings of the 27th annual conference on Computer graphics and interactive techniques, 2000, pp. 335-342.

Schops et al., "SurfelMeshing: Online Surfel-Based Mesh Reconstruction," CoRR, Oct. 2018, arxiv.org/abs/1810.00729v1, 13 pages.

Stuckler et al., "Efficient Mobile Robot Navigation using 3D Surfel Grid Maps," In Proc. of the German Conference on Robotics, May 2012, 5 pages.

Stuckler et al., "Multi-Resolution Surfel Maps for Efficient Dense 3D Modeling and Tracking," Journal of Visual Communication and Image Representation, Jan. 2014, 25(1):137-147.

Wang et al., "Real-time Scalable Dense Surfel Mapping," 2019 International Conference on Robotics and Automation, May 2019, pp. 6919-6925.

Xieyuanli et al., "SuMa++: Efficient LiDAR-based Semantic SLAM," 2019 IEEE/RSJ International Conference on Intelligent Robots and Systems, Nov. 2019, pp. 4530-4537.

International Preliminary Report on Patentability in International Appln. No. PCT/US2021/043138, dated Mar. 23, 2023, 20 pages.

\* cited by examiner

ANNOTATED SURFEL MAPS

CROSS-REFERENCE TO RELATED APPLICATION

This application is a continuation of U.S. patent application Ser. No. 17/015,809, filed Sep. 9, 2020, the disclosure of which is expressly incorporated herein by reference in its entirety.

TECHNICAL FIELD

This disclosure relates to processing and annotation of maps, and more particularly to the generation and use of surfel maps with semantic labels.

BACKGROUND

Autonomous vehicles include self-driving cars, boats, and aircraft. Autonomous vehicles use a variety of on-board sensors in tandem with map representations of the environment in order to make control and navigation decisions. However, without additional information regarding the objects in the environment depicted by the map representation, interpretation of conflicts between the real-time sensor data and the map representation of the environment can be challenging.

SUMMARY

This specification describes how a vehicle, e.g. an autonomous or semi-autonomous vehicle, can use a surfel map with semantic labels and real-time sensor data to generate a prediction for a state of an environment surrounding the vehicle. A system on-board the vehicle can obtain the surfel data, e.g. surfel data that has been generated by one or more vehicles navigating through the environment at respective previous time points, from a server system and the sensor data from one or more sensors on-board the vehicle. The system can then combine the surfel data and the sensor data to generate a prediction for one or more objects detected in the environment.

The system need not treat the existing surfel data or the new sensor data as a ground-truth representation of the environment. Instead, the system can assign a particular level of uncertainty to both the surfel data and the sensor data, and combine both forms of data to generate a representation of the environment that is typically more accurate than either the surfel data or the sensor data in isolation.

Some existing systems use a 2.5-dimensional system to represent an environment, which limits the representation to a single element having a particular altitude for each (latitude, longitude) coordinate in the environment. Using techniques described in this specification, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world, generated offline using sensor data generated at previous time points, to navigate through a particular environment. These systems can be unreliable, because the state of the environment might have changed since the representation was generated offline. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data, such as one or more semantic labels, allows the system to get a jump-start on the prediction and plan ahead for regions that are not yet in the range of the sensors of the vehicle, while the sensor data allows the system to be agile to changing conditions in the environment. Further, using techniques described in this specification, semantic labels characterizing one or more objects in the environment depicted by the surfel map can be used by the on-board system to more accurately interpret online sensor data received by the system and corresponding to the respective environment. For example, semantic labels associated with the surfels in the surfel map can help improve the accuracy in interpreting real-time sensor data by providing one or more predicted characteristics for each object represented in the surfel map. In addition, the semantic labels in a surfel map can indicate a likelihood that a particular object in the environment represented by the surfel map has one or more particular characteristics, which improves the accuracy of interpretation of the real-time sensor data received by the system.

Using a surfel representation to combine the existing surfel data and the new sensor data can be particularly efficient with respect to the time, memory, and processing power required. Using techniques described in this specification, a system can quickly integrate new sensor data with the data in the surfel map to determine one or more characteristics of an object within an environment. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that that must be untangled. Updating the mesh can therefore be a lengthy and computationally expensive process.

By using techniques described herein, a system can improve vehicle localization and sensor calibration by providing additional semantic information in the surfel map. For example, by providing semantic labels for each surfel in a surfel map, surfels corresponding to more dynamic types of objects, as identified by the semantic labels, can be given less weight in calculations for localizing a vehicle or calibrating sensor(s) on the vehicle in order to improve accuracy of these processes.

The techniques described herein can also be used to perform pose estimation. For example, kea and localize systems estimate the six degrees of freedom position and orientation of a vehicle within the world. A key part of the process of estimating the position and orientation of a vehicle is matching sensor data against a surfel map. By utilizing the techniques described herein, a richer surfel map with semantic labels can be provided for pose estimation, which improves the process of estimating the vehicle's position and orientation within an environment. For example, when running a registration algorithm in the localize code (e.g., using an iterative closest point algorithm), correspondences in surfels with semantic labels indicating a high probability of dynamism can be given less weight than correspondences in surfels with semantic labels indicating a low probability of dynamism, since objects in the environment that are less dynamic are less likely to change compared to the representation of the corresponding objects in the surfel ma. For example, surfels with a semantic label indicating a "trash can" object type are given less weight in pose estimation compared to surfels with a semantic label indicating a "building" object type since trash cans move often compared to buildings. In addition, surfels with semantic labels indicating a "vegetation" object type can be down weighted during pose estimation since the shape and size of vegetation objects are likely to change. For example, bushes can be trimmed. Further, even though a whole tree rarely moves, the leaves and branches of the tree may flutter in the wind. As such, surfels with semantic labels indicating a "vegetation" object type can be down weighted during pose estimation to improve pose estimation.

Similar weightings can be provided during sensor calibration in order to improve the accuracy of sensor calibration. For example, sensor data corresponding to one or more objects with high probabilities of dynamism in the surfel map can be down weighted and relied on less heavily during sensor calibration, as these objects are more likely to change shape and position compared to less dynamic objects in the system.

In addition, using techniques described herein, semantic information provided in the surfel map can allow for improved false object detection. For example, based on one or more semantic labels indicating a reflectivity of one or more objects in the environment, the reflection of an objection detected by sensor(s) can be more accurately interpreted as a reflection (i.e., "false object") rather than a true object.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1A:
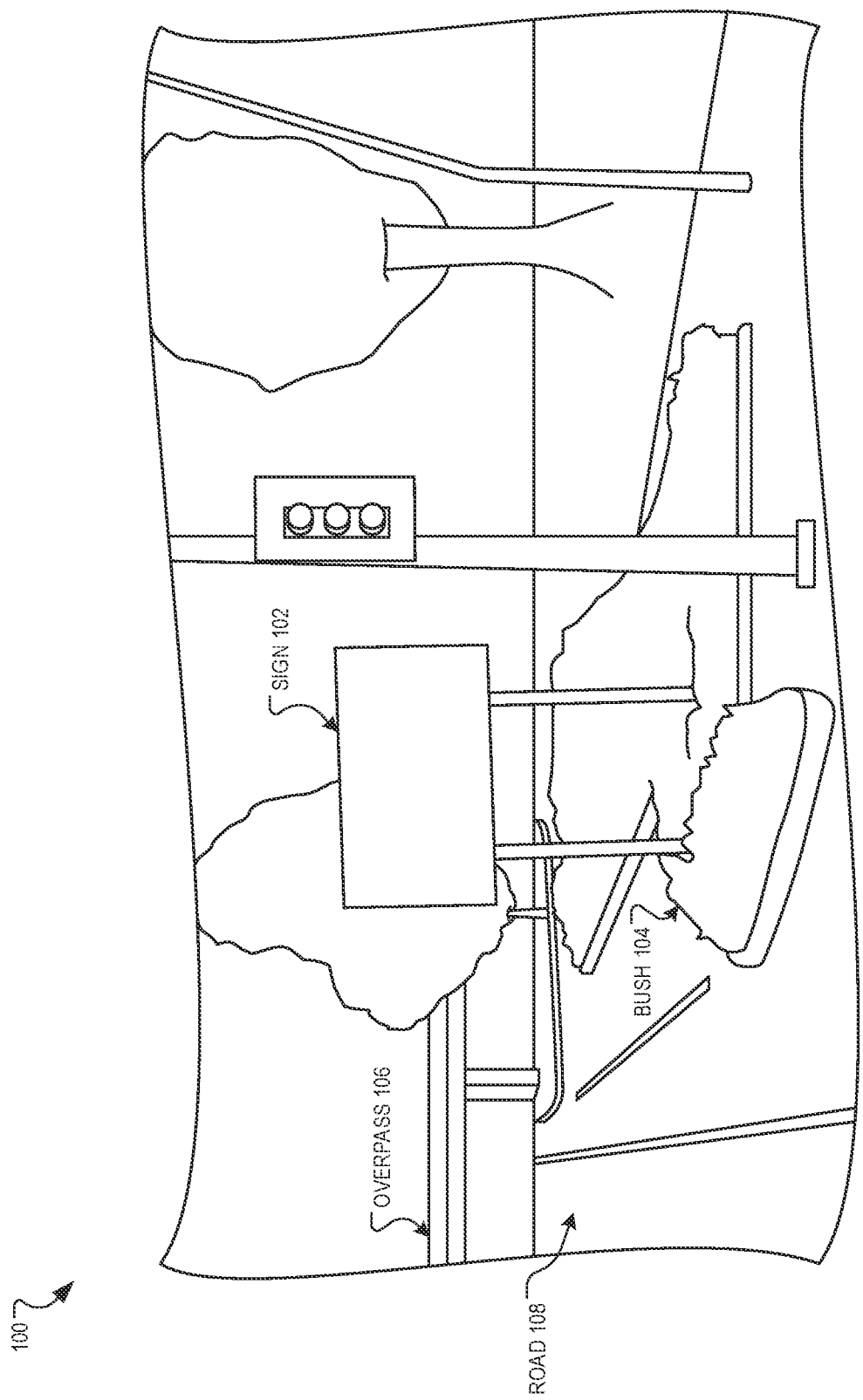
FIG. 1A is an illustration of an example environment.

This specification describes systems, apparatus, and methods for the generation and use of a surfel map with semantic labels.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g. a vector with a magnitude of 1 that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can corresponds to large, flat areas of the environment, while smaller surfels can represent areas of the environment that require higher detail.

In this specification, a surfel map is a collection of surfels that each correspond to a respective location in the same environment. The surfels in a surfel map collectively represent the surface detections of objects in the environment. As will be described in further detail herein, each surfel in a surfel map can have additional data associated with it, e.g. one or more labels describing the surface or object characterized by the surfel.

A surfel map can characterize a real-world environment, e.g. a particular portion of a city block in the real world, or a simulated environment, e.g. a virtual intersection that is used to simulate autonomous driving decisions to train one or more machine learning models. As a particular example, a surfel map characterizing a real-world environment can be generated using sensor data that has been captured by sensors operating in the real-world environment, e.g. sensors on-board a vehicle navigating through the environment. In some implementations, an environment can be partitioned into multiple three-dimensional volumes, e.g. a three-dimensional grid of cubes of equal size, and a surfel map characterizing the environment can have at most one surfel corresponding to each volume.

FIG. 1A is an illustration of an example environment 100. The environment 100 is depicted from the point of view of a sensor on-board a vehicle navigating through the environment 100. The environment 100 includes a sign 102, a bush 104, an overpass 106, and a road 108.

Figure 1B:
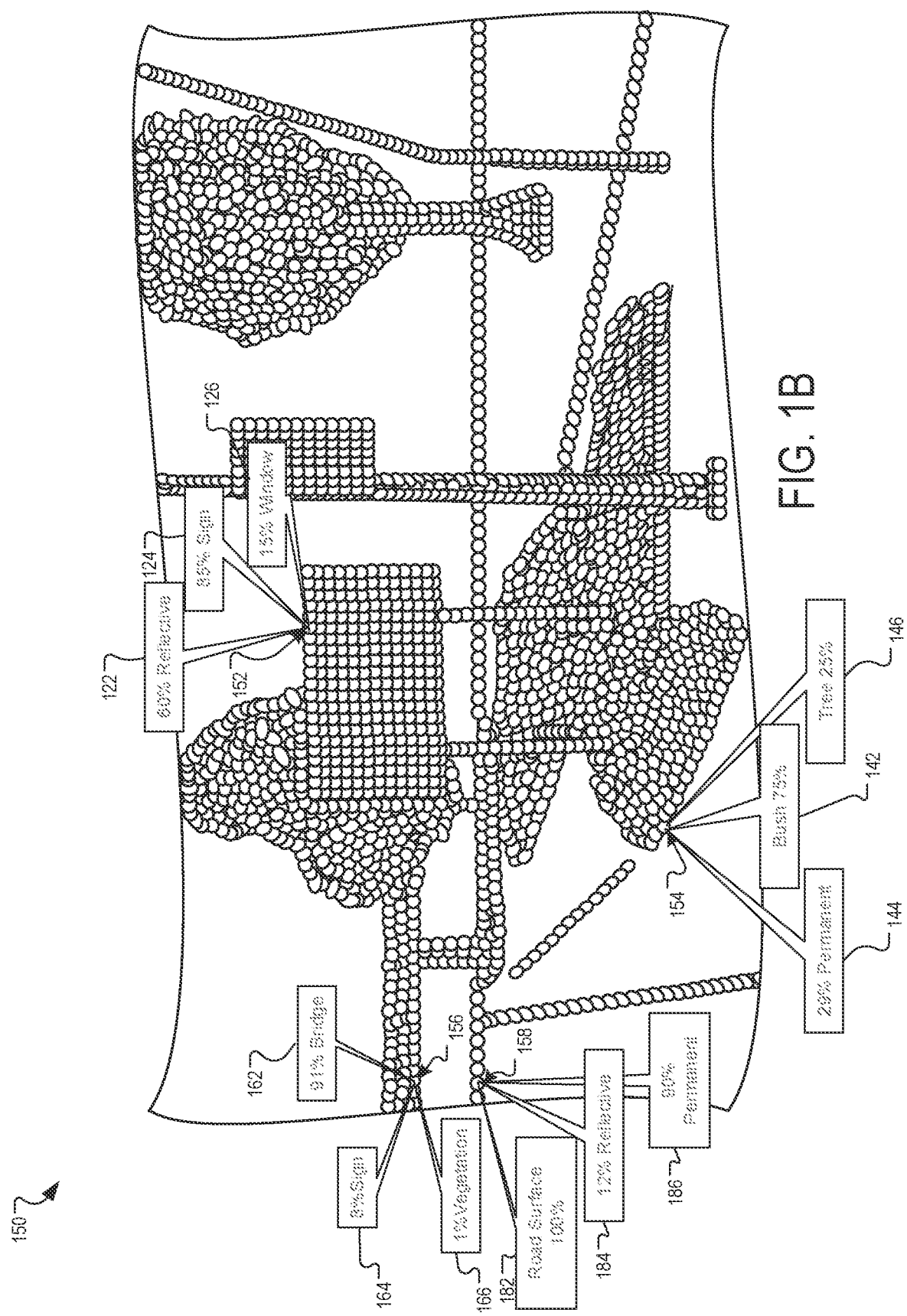
FIG. 1B is an illustration of an example surfel map of the environment of FIG. 1A.

FIG. 1B is an illustration of an example surfel map 150 of the environment 100 of FIG. 1A. As can be seen in FIG. 1B, the surfel map 150 includes a plurality of surfels 152, 154, 156, 158 that represent the objects in the environment 100 depicted in FIG. 1A. Each surfel in the surfel map 150 is represented by a disk, and defined by three coordinates (latitude, longitude, altitude) that identify a position of the surfel in a common coordinate system of the environment 100, and by a normal vector that identifies an orientation of the surfel. For example, each surfel can be defined to be the disk that extends some radius, e.g. 1, 10, 25, or 100 centimeters, around the coordinate (latitude, longitude, altitude). In some other implementations, the surfels can be represented as other two-dimensional shapes, e.g. ellipsoids or squares.

In generating the surfel map 150, the environment 100 can be partitioned into a grid of equal-sized voxels, and each voxel in the grid of the environment 100 can contain at most one surfel, where, e.g., the coordinate (latitude, longitude, altitude) of each surfel defines the voxel that the surfel occupies. That is, if there is a surface of an object at the location in the environment corresponding to a voxel, then there can be a surfel characterizing the surface in the voxel; and if there is not a surface of an object at the location, then the voxel is empty. In some other implementations, a single surfel map can contain surfels of various different sizes that are not organized within a fixed spatial grid.

For any latitude and longitude in the environment 100, i.e. for any given position (latitude, longitude) in a plane running parallel to the ground of the environment 100, the surfel map 150 can include multiple different surfels each corresponding to a different altitude in the environment 100, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 106 in the environment 100 and the road 108 underneath the overpass 106. The surfel map, on the other hand, is able to represent both the overpass 106 and the road 108 underneath the overpass 106, e.g. with an overpass surfel 156 and a road surfel 158 that have the same latitude coordinate and longitude coordinate but a different altitude coordinate.

As can be seen in FIG. 1B, the surfel map 150 can include one or more semantic labels 122, 124, 126, 142, 144, 146, 162, 164, 166, 182, 184, 186, each semantic label corresponding to a respective surfel 152, 154, 156, 158 in the surfel map 150 and providing semantic information characterizing the respective surfel. For example, each surfel 152, 154, 156, 158 in the surfel map 150 can have one or more corresponding semantic labels 122, 124, 126, 142, 144, 146, 162, 164, 166, 182, 184, 186 that each indicate a predicted characteristic of the object represented by the respective surfel.

As can be seen in FIG. 1B, one or more of the surfels 152, 154, 156, 158 in the surfel map 150 can be associated with multiple semantic labels (or a "vector" of semantic labels). For example, the surfel 158 representing road 108 in environment 100 has three semantic labels: a first label 182 identifying the surfel 158 as representing a road surface, a second label 184 identifying the surfel 158 as representing a non-reflective object, and a third label 186 identifying the permanence of the object represented by the surfel 158.

Each semantic label can include a respective probability indicating the likelihood that the object in the environment represented by the respective surfel has the characteristic represented by the semantic label. For example, surfel 156 in surfel map 150 representing overpass 106 in environment 100 includes three semantic labels 162, 164, 166: a first semantic label 162 indicating a 91% probability that the object represented by the surfel 156 is a bridge, a second semantic label 164 indicating an 8% probability that the object represented by the surfel 156 is a sign, and a third semantic label 166 indicating a 1% probability that the object represented by the surfel 156 is vegetation.

Semantic labels can be used to predict the object type of the object being represented by the respective surfel. For example, surfel 152 in surfel map 150 representing sign 102 in environment 100 includes semantic labels 124 and 126 that indicate a predicted object type for the object represented by surfel 152. As can be seen in FIG. 1B, semantic label 124 indicates an 85% probability that the object represented by surfel 152 is a sign and semantic label 126 indicates a 15% probability that the object represented by surfel 152 is a window 126. Object type semantic labels can include any type of object that could be found in the environment including, but not limited to, trees, bushes, hedges, vegetation, buildings, road surfaces, signs, windows, sidewalks, vehicles, cyclists, and pedestrians, to name just a few examples.

Each surfel can be associated with reflectivity information that represents a predicted reflectivity of the object represented by the surfel. For example, a surfel 152 representing the sign 102 in the environment 100 can include or be associated with reflectivity information indicating that the object represented by surfel 152 is 60% reflective or has a 60% probability of being a reflective object. In contrast, surfel 158 representing road 108 in environment 100 can include reflectivity information indicating that the object represented by the surfel 158 is 12% reflective or has a 12% probability of being a reflective object. In some implementations, the predicted reflectivity of an object represented by a surfel can be determined based on one or more semantic labels that indicate the type of object represented by the surfel. For example, the system can store a mapping between object types and predicted reflectivity information. Thus, a surfel labeled as representing a window can be mapped to greater reflectivity than a surfel labeled as representing a tree.

As another particular example, each surfel can have one or more semantic labels, with associated probabilities, predicting the permanence of the object characterized by the surfel. For example, a "permanent" semantic label might have a high associated probability for surfels characterizing a sign or lane marker, while the "permanent" semantic label might have a low associated probability for surfels characterizing less permanent objects, such as trash cans.

As depicted in FIG. 1B, surfel 158 representing road 108 in environment 100 includes semantic label 186 indicating a 90% probability that the object represented by the surfel 158 is a permanent object. In contrast, surfel 154 representing bush 104 in environment 100 includes a semantic label 144 indicating a 29% probability that the object represented by the surfel 154 is a permanent object. As will discussed in further detail herein, in some implementations, the predicted permanence of an object represented by a surfel can be determined based on one or more semantic labels that indicate the type of object represented by the surfel (e.g., a building object type semantic label indicates a higher level of permanence than a semantic label indicating a vegetation object type).

Various classes of semantic information can be represented by semantic labels, such as object type, color, reflectivity, or opacity of the object characterized by the surfel. For example, surfel 152 representing sign 102 in environment 100 might have semantic labels predicting the color of the object represented by surfel 152 as "green" with 80% probability and "blue" with 20% probability. Because the sign 102 is completely opaque, a semantic label of the sign surfel 152 might predict that the object represented by surfel 152 is "opaque" with 99% probability. Further, because sign 102 reflects some light, a semantic label for surfel 152 (e.g., semantic label 122) might predict that the object represented by surfel 152 is "reflective" with 60% probability.

As another example, the surfel map 150 includes a surfel 154 that characterizes a portion of bush 104 depicted in FIG. 1A. As depicted in FIG. 1B, surfel 154 includes a first semantic label 142 predicting with 75% probability that the type of the object characterized by the surfel 154 is "bush" and another semantic label 146 predicting with 25% probability that the type of the object characterized by the surfel 154 is "tree". Because bushes can grow, be trimmed, and die with relative frequency, the semantic label 144 labelling surfel 154 as "permanent" has a 29% probability. In some implementations, the surfel 154 might have color labels predicting the color of the bush 104 to be "green" with 70% probability and "yellow" with 30% probability. Because the bush 104 is not completely opaque, a semantic label predicting the opacity of the object represented by the surfel 154 might predict that the object is "opaque" with 70% probability. Further, as the bush 104 is not generally reflective, a semantic label predicting the reflectivity of the object represented by the surfel 154 might predict that the object is "reflective" with 20% probability.

As will be described in further detail herein, in some implementations, the semantic labels and respective probabilities for each surfel 152, 154, 156, 158 are generated by a trained machine learning model.

After a surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map, including the semantic labels of the surfel map, along with real-time sensor measurements of the environment in order to make better driving decisions than if the vehicle were to rely on the real-time sensor measurements alone.

Figure 2:
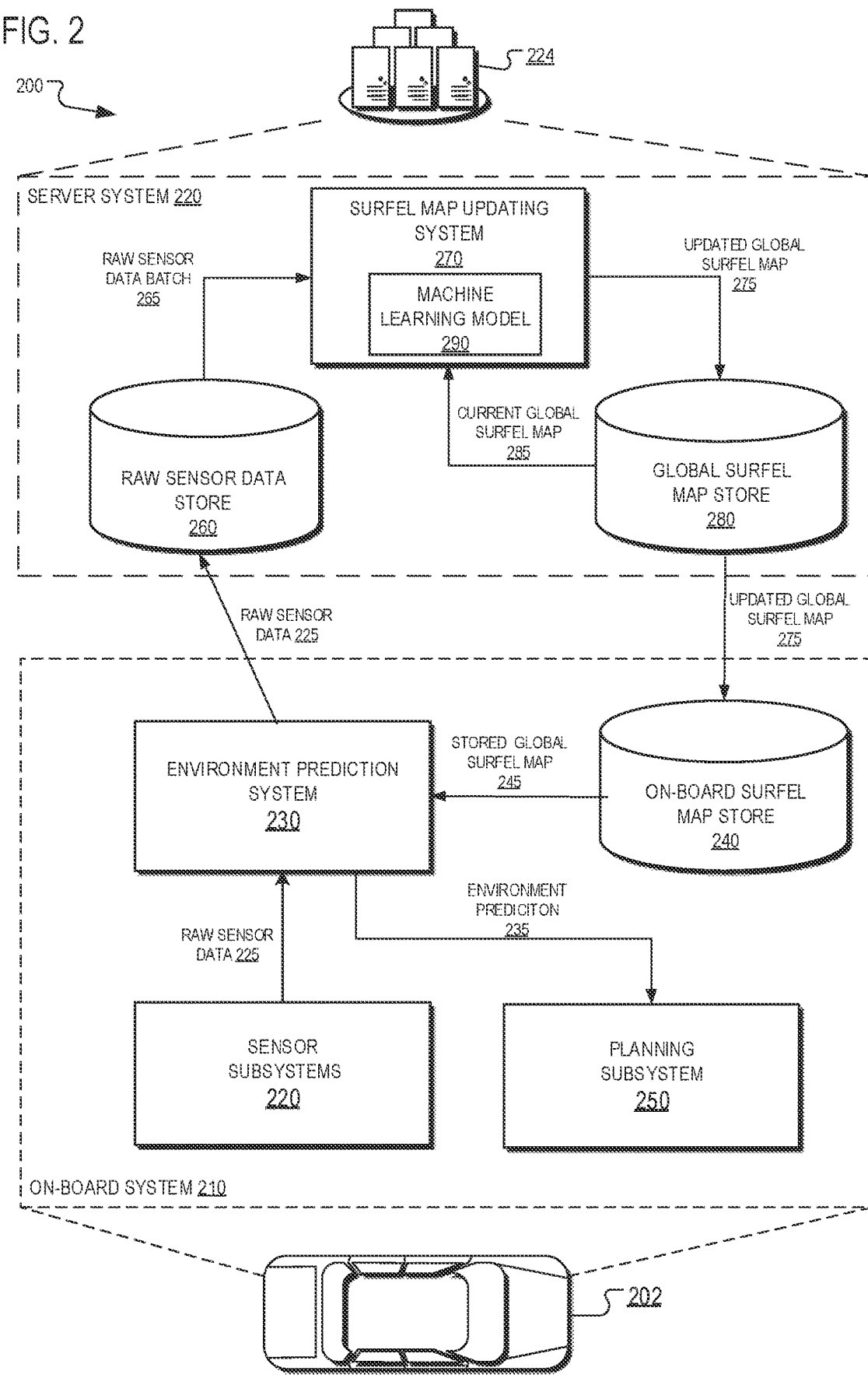
FIG. 2 is a diagram of an example system.

FIG. 2 is a diagram of an example system 200 for generating and implementing a surfel map with semantic labels, such as surfel map 150 of FIG. 1B. The system 200 can include multiple vehicles, each with a respective on-board system. For simplicity, a single vehicle 202 and its on-board system 210 are depicted in FIG. 2. The system 200 also includes a server system 220 that is accessible by every vehicle in the system 200.

The vehicle 202 in FIG. 2 is illustrated as an automobile, but the on-board system 210 can be located on-board any appropriate vehicle type. The vehicle 202 can be a fully autonomous vehicle that determines and executes fully-autonomous driving decisions in order to navigate through an environment. The vehicle 202 can also be a semi-autonomous vehicle that uses predictions to aid a human driver. For example, the vehicle 202 can autonomously apply the brakes if a prediction indicates that a human driver is about to collide with an object in the environment, e.g. an object or another vehicle represented in a surfel map.

As depicted in FIG. 2, the on-board system 210 includes one or more sensor subsystems 220. The sensor subsystems 220 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections, as well as the time that the reflection was received. A distance between the sensor and an object detected by the sensor can be computed by determining the amount of time elapsed between a pulse and receipt of its corresponding reflection. The sensor can continually sweep a particular space in angle, azimuth, or both. Sweeping in azimuth, for example, can allow a sensor to detect multiple objects along the same line of sight.

The sensor subsystems 220 or other components of the vehicle 202 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. In some implementations, the sensor data is camera sensor data and each group of camera sensor measurements can be represented as an image patch, e.g., an RGB image patch.

As depicted in FIG. 2, once the sensor subsystems 220 classify one or more groups of raw sensor measurements as being measures of a respective object of a particular type, the sensor subsystems 220 can compile the raw sensor measurements into a set of raw sensor data 225, and send the raw sensor data 225 to an environment prediction system 230.

The on-board system 210 also includes an on-board surfel map store 240 that stores a global surfel map 245 of the real-world. As will be described in further detail herein, the global surfel map 245 is an existing surfel map that has been generated by combining sensor data captured by multiple vehicles navigating through the real world.

Generally, every vehicle in the system 200 uses the same global surfel map 245. In some cases, different vehicles in the system 200 can use different global surfel maps 245, e.g. when some vehicles have not yet obtained an updated version of the global surfel map 245 from the server system 220.

Each surfel in the global surfel map 245 can have associated data that encodes multiple classes of semantic information for the surfel. For example, as previously discussed, for each of the classes of semantic information, each surfel in the surfel map can have one or more semantic labels characterizing a prediction for the surfel corresponding to the class, where each semantic label has a corresponding probability. As a particular example, each surfel can have multiple semantic labels, with associated probabilities, predicting the type of the object characterized by the surfel, e.g. "pole" with 80% probability, "street sign" with 15% probability, and "fire hydrant" with 5% probability.

The environment prediction system 230 can receive the global surfel map 245 and combine the surfel data in the surfel map 245 with the raw sensor data 225 to generate an environment prediction 235. The environment prediction 235 includes data that characterizes a prediction for the current state of the environment, including predictions for an object or surface at one or more locations in the environment.

For example, the raw sensor data 225 captured by the sensor subsystems 220 might indicate that the environment through which the vehicle 202 is navigating has changed compared to the depiction of the corresponding environment in the global surfel map 245. In some cases, the changes might be large and discontinuous, e.g., if a new building has been constructed or a road has been closed for construction since the last time the portion of the global surfel map 245 corresponding to the environment has been updated. In some other cases, the changes might be small and continuous, e.g., if a bush grew by an inch or a leaning pole slightly increased its tilt. In either case, the raw sensor data 225 can capture these changes to the environment, and the environment prediction system 230 can use the raw sensor data 225 in combination with the data characterizing the environment stored in the global surfel map 245 to generate an environment prediction 235.

For one or more objects represented in the global surfel map 245, the environment prediction system 230 can use the raw sensor data 225 in combination with the global surfel map 245 to determine a probability that the object is currently in the environment. In some implementations, the environment prediction system 230 can use a Bayesian model to generate the predictions of which objects are currently in the environment, where the data in the global surfel map 245 is treated as a prior distribution for the state of the environment, and the raw sensor data 225 is an observation of the environment. The environment prediction system 230 can perform a Bayesian update to generate a posterior belief of the state of the environment, and include this posterior belief in the environment prediction 235. In some implementations, the raw sensor data 225 also has a probability distribution for each object detected by the sensor subsystem 220 describing a confidence that the object is in the environment at the corresponding location; in some other implementations, the raw sensor data 225 includes detected objects with no corresponding probability distribution.

For example, if the global surfel map 245 includes a representation of a particular object, and the raw sensor data 225 includes a strong detection of the particular object in the same location in the environment, then the environment prediction 235 can include a prediction that the object is in the location with high probability. If the global surfel map 245 does not include the particular object, but the raw sensor data 225 includes a strong detection of the particular object in the environment, then the environment prediction 235 might include a weak prediction that the object is in the location indicated by the raw sensor data 225. If the global surfel map 245 does include the particular object, but the raw sensor data 225 does not include a detection of the object at the corresponding location, or includes only a weak detection of the object, then the environment prediction 235 might include a prediction that has moderate uncertainty.

That is, the environment prediction system 230 might assign more confidence to the correctness of the global surfel map 245 than to the correctness of the raw sensor data 225, or vice versa. In either case, the environment prediction system 230 does not treat the raw sensor data 225 or the global surfel map 245 as a ground-truth, but rather associates uncertainty with both the surfel map 245 and the raw sensor data 225 in order to combine them. Approaching each input in a probabilistic manner can generate a more accurate environment prediction 235, as the raw sensor data 225 might have errors, e.g. if the sensors in the sensor subsystems 220 are miscalibrated, and the global surfel map 245 might have errors, e.g. if the state of the world has changed.

The environment prediction 235 generated by the environment prediction system 230 can be determined based partly on the semantic information for each object in the environment provided by the surfel map 245. For example, the environment prediction system 230 can use a Bayesian model to update the associated data of each surfel in the global surfel map 245 using the raw sensor data 225 in order to generate a prediction for each semantic class and for each object in the environment. For each particular object represented in the global surfel map 245, the environment prediction system 230 can use the semantic label(s) of the surfels corresponding to the particular object as a prior distribution for the true labels for the particular object. The environment prediction system 230 can then interpret the raw sensor data 225 in view of the associated probabilities for each class of semantic information for the particular object in order to determine an environment prediction 235 regarding the characteristics of the objects within the environment. In some implementations, the raw sensor data 225 also has a probability distribution of labels for each semantic class for each object detected by the sensor subsystem 220; and in some other implementations, the raw sensor data 225 has a single label for each semantic class for each detected object.

Continuing the previous particular example, where a particular surfel in the surfel map 245 has semantic labels that characterize the object represented by the surfel as a pole with 80% probability, a street sign with 15% probability, and fire hydrant with 5% probability, and if the sensor subsystems 220 detect a pole at the same location in the environment with high probability, then the environment prediction system 230 might generate an environment prediction 235 for the object characterizing the object as a pole with 85% probability, as a street sign with 12% probability, and as a fire hydrant with 3% probability.

As another example, if a particular surfel in the surfel map 245 has a semantic label that characterizes the object represented by the surfel as being reflective with a low probability (e.g., a 15% probability), but the sensor subsystems 220 detect that the object at the same location is reflective with a high probability, then the environment prediction system 230 might determine that environment at that location has changed. Alternatively, the environment prediction system 230 may determine based on additional semantic information for the surfel representing the object at the particular location that the object is the same, but a characteristic about the object has changed. For example, continuing the previous example, if the surfel includes a semantic label that characterizes the object as being reflective with a low probability (e.g., a 15% probability) and includes an additional label that characterizes the object represented by the surfel as being a road surface with high probability (e.g., a 95% probability). However, if the sensor subsystems 220 detect that the object at the same location is reflective with a high probability, the environment prediction system 230 may predict that the detected object is a road surface that is wet or icy, which is currently causing the road surface to be reflective.

In another example, if a particular surfel in the surfel map 245 has a semantic label that characterizes the object represented by the surfel as a first object type (e.g., a sidewalk), but the sensor subsystems 220 detect that the object at the same location is another type of object (e.g., a tree) with a high probability, then the environment prediction system 230 may give priority to the sensor data and determine that the environment at that respective location has changed and reflect this change in the environment prediction 235. Alternatively, the environment prediction system 230 may give priority to the semantic data based on additional semantic labels provided for the surfel representing the object. For example, if a surfel representing an object at a particular location has a first semantic label characterizing the object as being reflective with a high probability (e.g., greater than 55% probability) and a second semantic label characterizing the object as being particular object type (e.g., window) with a high probability (e.g., greater than 65% probability), but the sensor subsystems 220 detect that the object at the same location is a different object type (e.g., tree), based on the reflectivity of the object predicted by the first semantic label, the environment prediction system 230 may predict that the object type detected by the sensor subsystems 220 is merely a reflection (i.e., a "ghost object") that is being reflected by the true object at the respective location (such as, a window). As a result, the environment prediction system 230 will give priority to the semantic data over the sensor data and will provide an environment prediction 235 indicating that the object at the respective location is of the object type identified by the respective object type semantic label in surfel map 245 (e.g., window).

In determining whether an object detected by the sensor subsystems 220 at a particular location is a "true object" or is merely a reflection of another object (a "ghost object"), the environment prediction system 230 can determine whether the surfel corresponding to the particular location has a semantic label indicating a probability of the object represented by the surfel as being reflective above a threshold probability. If the semantic label for the surfel representing the object indicates a probability of reflection above the threshold probability, the environment prediction system 230 predicts that a mismatch between the object type indicated in the surfel map and the object type detected by the sensor subsystems 220 for the object is the result of reflective nature of the object, and the environment prediction 235 the respective location indicates the object type represented by the surfel map 245. In contrast, if the semantic label for the surfel representing the object indicates a probability of reflection below the threshold probability, then the environment prediction system 230 predicts that the mismatch between the object type indicated in the surfel map 245 and the object type detected by the sensor subsystems 220 is the result of a change in the environment, and the environment prediction 235 for the respective location indicates the object type detected by the sensor subsystems 220.

The environment prediction system 230 can use semantic labels indicating the permanence of an object represented in the surfel map 245 to determine an environment prediction 235. For example, if the representation of a location in the environment by the surfel map 245 differs from the sensor data 225 generated by sensor subsystems 220 for the respective location, one or more semantic labels indicating the permanence of objects at the respective location can be used to determine a probability that the environment has changed (and, thus the surfel map 245 is outdated) or a probability that the raw sensor data 225 is erroneous. As an example, a surfel in the surfel map 245 representing an object at a particular location can include a first semantic label that indicates with a high probability that the object is of a first type (e.g., bush) and a second semantic label that indicates that the object has a low probability of being permanent (e.g., less than 30% probability of permanence). In contrast, the sensor data 225 can indicate that the object at the particular location is a second, different object type (e.g., a curb). In view of the semantic label indicating a low probability of permanence of the object, the environment prediction system 230 will predict that the object has changed since the surfel map 245 was generated, and will give priority to the raw sensor data 225. As such, the environment prediction 235 will predict that the object is of the object type detected by the sensor subsystem 220 (curb) with high probability.

In contrast, if the permanence semantic label indicates that the object at the particular location has a high probability of being permanent (e.g., more than 60% probability of permanence), the environment prediction system 230 can predict that the object has not changed since generation the surfel map 245, and will contribute the mismatch in object type between the sensor data and surfel data as the result of sensor error. As such, the environment prediction system 230 will give priority to the object type identified for the object by the corresponding semantic label in the surfel map 245, and the environment prediction 235 will predict that the object is of the object type indicated by the semantic label in the surfel map 245 with high probability.

However, even if the permanence semantic label indicates that the object at the particular location has a high probability of being permanent (e.g., more than 60% probability of permanence), the environment prediction system 230 can predict that the mismatch in the data is due to a change in the environment, and give priority to the raw sensor data 225. For example, the sensor data 225 received by the sensor subsystem 220 can be aggregated over time and if the aggregated sensor data 225 provided to the environment prediction system 230 regarding a particular object is both consistent and contradicts the surfel data in the surfel map 245, and is not just momentarily deviating from the surfel map 245, the environment prediction system 230 can predict with a high probability that the sensor data 225 is accurate and that the environment changed. As such, the environment prediction 235 will predict that the object is of the object type detected by the sensor subsystem 220 (curb).

In determining whether to give priority to the object type identified in the raw sensor data 225 versus the object type identified by the semantic label in the surfel map 245, the environment prediction system 230 can determine whether the surfel corresponding to the particular location has a semantic label indicating a probability of permanence above a threshold probability. If the semantic label for the surfel representing the object indicates a probability of permanence above the threshold probability, the environment prediction system 230 can predict that the mismatch between the object type indicated in the surfel map and the object type detected by the sensor subsystems 220 is the result of errors in the raw sensor data 225. As a result, the environment prediction 235 indicates the object type represented by the surfel map 245 for the object with high probability. In contrast, if the semantic label for the surfel representing the object indicates a probability of permanence below the threshold probability, then the environment prediction system 230 can predict that the mismatch between the object type indicated in the surfel map 245 and the object type detected by the sensor subsystems 220 is the result of a change in the environment. As a result, the environment prediction 235 for the respective location indicates the object type detected by the sensor subsystems 220 for the object with a high probability.

The permanence of an object represented by the surfel map 245 can be determined based on a semantic label indicating the object type for the surfel representing the object. For example, if a semantic label indicates that an object represented by a surfel has a high probability of being vegetation, the environment prediction system 230 can predict that the object represented by the surfel has a low probability of being permanent. In contrast, if the semantic label indicates that the object represented by the surfel has a high probability of being a more permanent type of object, such as a building or asphalt, the environment prediction system 230 can predict that the object represented by the surfel has a high probability of being permanent.

The environment prediction system 230 can use the permanence of an object, as identified by one or more semantic labels in the surfel map, to weigh the system's 230 reliance on the sensor data 225 corresponding to that object. For example, a surfel map may indicate that the environment includes a first object with a semantic label indicating high probability of permanence (for example, a "building" semantic label) and a second object with a semantic label indicating a low probability of permanence (for example, a "vegetation" semantic label). Based on this difference in permanence between the two objects indicated by the respective semantic labels, the environment prediction system 230 can rely more heavily on the sensor data 225 corresponding to the first object with the higher probability of permanence during the object detection process compared to the sensor data corresponding to the second object with the lower probability of permanence, since the first object is less likely to change. As a result, the sensor data and the surfel data regarding the first object are more likely to be in agreement. In addition, sensor data 225 that corresponds to objects in the surfel map 245 that have a low probability of permanence (as indicated by semantic labels) can be down weighted or weighted less heavily by the environment prediction system 230 in generating an environment prediction 235. As a result, the environment prediction 235 can be based more heavily on sensor data 225 that corresponds with objects in the surfel map 245 having a high probability of permanence.

As depicted in FIG. 2, the environment prediction system 230 can provide the environment prediction 235 to a planning subsystem 250, which can use the environment prediction 235 to make autonomous driving decisions, e.g., generating a planned trajectory for the vehicle 202 through the environment. By interpreting the raw sensor data 225 in view of the semantic labels for the corresponding surfels in the global surfel map 245, on-board system 210 can generate an improved environment prediction 235 due to the additional context provided by the various characteristics and probabilities identified in the semantic labels. As a result, the autonomous driving decisions generated by the planning subsystem 250 based on the environment prediction 235 can be improved and executed with increased confidence.

The environment prediction system 230 can provide the raw sensor data 225 to a raw sensor data store 260 located in the server system 220. As will be described in further detail herein, in some implementations, if, based on the raw sensor data 225, the environment prediction system 230 determines that the environment has changed such that the environment differs from the global surfel map 245 (i.e., the global surfel map 245 is outdated), the raw sensor data 225 can be used by the server system 220 to generate an updated global surfel map 275.

The server system 220 is typically hosted within a data center 224, which can be a distributed computing system having hundreds or thousands of computers in one or more locations.

The server system 220 includes a raw sensor data store 260 that stores raw sensor data generated by respective vehicles navigating through the real world. As each vehicle captures new sensor data characterizing locations in the real world, each vehicle can provide the sensor data to the server system 220. The server system 220 can then use the sensor data to generate or update the global surfel map 275 that every vehicle in the system 200 uses. That is, when a particular vehicle discovers that the real world has changed in some way, e.g. construction has started at a particular intersection or a street sign has been taken down, the vehicle can provide sensor data to the server system 220 so that the rest of the vehicles in the system 200 can be informed of the change.

The server system 220 also includes a global surfel map store 280 that maintains the current version of the global surfel map 285.

A surfel map updating system 270, also hosted in the server system 220, can obtain the current global surfel map 285 and a batch of raw sensor data 265 from the raw sensor data store 260 in order to generate an updated global surfel map 275, including updated semantic labels. In some implementations, the surfel map updating system 270 updates the global surfel map at regular time intervals, e.g. once per hour or once per day, obtaining a batch of all of the raw sensor data 265 that has been added to the raw sensor data store 260 since the last update. In some other implementations, the surfel map updating system 270 updates the global surfel map whenever new raw sensor data 225 is received by the raw sensor data store 260. In some implementations, the surfel map updating system 270 generates the updated global surfel map 275 in a probabilistic way.

For each measurement in the batch of raw sensor data 265, the surfel map updating system 270 can determine a surfel in the current global surfel map 285 corresponding to the location in the environment of the measurement, and combine the measurement with the determined surfel. If there is not currently a surfel at the location of a new measurement, then the surfel map updating system 270 can generate a new surfel according to the measurement.

The surfel map updating system 270 can also update each surfel in the current global surfel map 285 that did not have a corresponding new measurement in the batch of raw sensor data 265 to reflect a lower certainty that an object is at the location corresponding to the surfel. In some cases, e.g. if the batch of raw sensor data 265 indicates a high confidence that there is not an object at the corresponding location, the surfel map updating system 270 can remove the surfel from the updated global surfel map 275 altogether. In some other cases, e.g. when the current global surfel map 285 has a high confidence that the object characterized by the surfel is permanent and therefore that the lack of a measurement of the object in the batch of raw sensor data 265 might be an error, the surfel map updating system 270 might keep the surfel in the updated global surfel map 275 but decrease the confidence of the updated global surfel map 275 that an object is at the corresponding location.

In addition to adding and removing surfels in the global surfel map 285 based on the raw sensor data 265, the surfel map updating system 270 can also update the semantic labels associated with each of the surfels in the updated surfel map 275 based on the raw sensor data 265. For example, in some implementations, the surfel map updating system 270 includes a trained machine learning model 290 that can be used to process the raw sensor data 265 to generate one or more semantic labels for each surfel in the updated surfel map 175.

The machine learning model 290 can be trained to identify one or more characteristics of an object represented by raw sensor data 265 and generate one or more semantic labels for a surfel representing the object. The machine learning model 290 can be trained using a set of training data that includes raw sensor data that has been labeled by human operators with one or more semantic labels (e.g., object type, reflectivity, opacity, color, and/or opacity). The training data can include user-labeled camera sensor data, user-labeled laser sensor data, user-labeled laser radar data, or a combination thereof. Once trained, the machine learning model 290 can be used to automatically generate or update semantic labels for a surfel map based on the raw sensor data 265 provided by one or more vehicles 202 traversing the environment.

After generating the updated global surfel map 275 with updated semantic labels, the surfel map updating system 270 can store the updated global surfel map 275 in the global surfel map store 280, replacing the stale global surfel map 285. Each vehicle in the system 200 can then obtain the updated global surfel map 275 from the server system 220, e.g., through a wired or wireless connection, replacing the stale version stored in the vehicle's on-board map store 240 with the retrieved updated global surfel map 275. In some implementations, each vehicle in the system 200 retrieves an updated global surfel map 275 whenever the global surfel map is updated and the vehicle is connected to the server system 220 through a wired or wireless connection. In other implementations, each vehicle in the system 200 retrieves the most recent updated global surfel map 275 at regular time intervals, e.g. once per day or once per hour.

Figure 3:
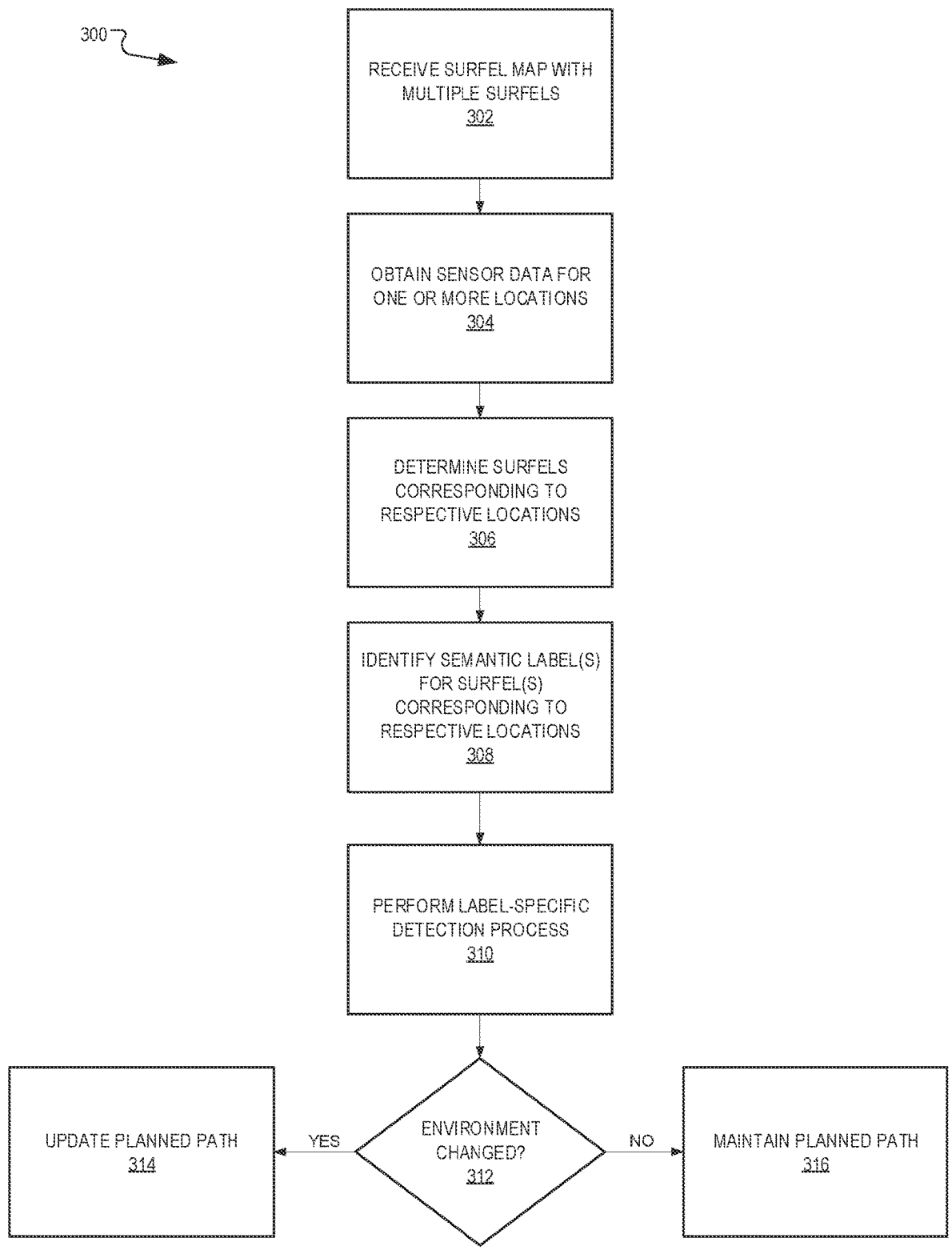
FIG. 3 is a flow diagram of an example process for combining surfel data and sensor data.

FIG. 3 is a flow diagram of an example process 300 for combining surfel data, including semantic labels, and sensor data. For convenience, the process 300 will be described as being performed by a system of one or more computers located in one or more locations. For example, an environment prediction system, e.g., the environment prediction system 230 depicted in FIG. 2, appropriately programmed in accordance with this specification, can perform the process 300.

The system receives a surfel map that includes multiple surfels (step 302). Each surfel in the surfel map corresponds to a respective different location in the environment. Each surfel in the surfel map can also have associated data that includes one or more semantic labels. Each semantic label included in the surfel map corresponds to a surfel and represents a predicted property of the object represented by the surfel. For example, each surfel can include one or more semantic labels that provide a prediction for each of one or more classes of semantic information for the surface represented by the surfel.

The system obtains sensor data for one or more locations in the environment (step 304). The sensor data has been captured by one or more sensors of a vehicle navigating the environment, e.g. the sensor subsystems 220 of the vehicle 202 depicted in FIG. 2. The surfel data in the received surfel map can be generated from data captured by one or more vehicles navigating through the environment at respective previous time points, e.g., the same vehicle that captured the sensor data and/or other vehicles.

The system determines one or more particular surfels corresponding to respective locations of the sensor data (step 306). For example, for each measurement in the sensor data, the system can select a particular surfel that corresponds to the same location as the measurement, if one exists in the surfel data. In addition, the system identifies one or more semantic labels associated with the one or more particular surfels corresponding to the locations of the sensor data (step 308).

The system performs a label-specific detection process for each surfel corresponding to the respective locations of the obtained sensor data (step 310). Based on the one or more semantic labels corresponding to a particular surfel and the corresponding obtained sensor data, a probability regarding one or more characteristics of the object represented by the surfel can be determined.

For example, in some cases, the surfel map and the obtained sensor data may "disagree" regarding the presence of an object or a particular type of object in a respective location, and the semantic labels for the corresponding surfel can be used to provide additional context regarding the presence and/or characteristics of the respective object. For example, when an object is reflective, a sensor that measures reflected light, e.g. a LIDAR sensor, may fail to detect the reflective object and may instead measure a detection of a different object in the environment whose reflection is captured off of the reflective object (i.e., a "ghost object").

As an example, a sensor might observe a tree reflected off a window at a particular location that does not correspond to the actual location of the tree (e.g., in the middle of a road). In such a scenario, the surfel map may include a semantic label for the surfel near the respective location that indicates that the object at the location is a road with a high probability, and the sensor data may indicate that the object at the respective location is a tree with a high probability, thus generating a mismatch between the data sets regarding the object type. However, a surfel near the respective location may include a first semantic label that indicates the object near the respective location is a window with a high probability and/or the surfel near the respective location may include a second semantic label indicating with high probability that the object near the respective location is a reflective with a high probability. Based on the semantic label(s) indicating with a high probability that the object near the respective location is reflective, the system can give preference to the surfel map data indicating that the object at the respective location is a road and generate an object prediction that the object at the particular location is a road, rather than a tree.

As another particular example, when an object is transparent, a sensor can fail to measure a detection of the object and instead measure a detection of a different object that is behind the transparent object. A surfel in the surfel map corresponding to the transparent object at the particular location may include an 'opacity' semantic label, indicating a high likelihood that the object is transparent. Thus, if the surfel representing the transparent object includes a semantic label indicating a first object type (e.g., window), and the sensor data indicates that the object is of a different object type (e.g., chair), based on the semantic label indicating that the object has a high probability of being transparent, the system can give preference to the semantic label in the surfel map indicating that the object at the respective location is a window and generate an object prediction that the object at the particular location is a window.

As another example, if a surfel includes a first label indicating that the object represented by the surfel is a hedge with high probability, and the sensor data captures a measurement directly above the location corresponding to the surfel and the sensor measurement indicates the presence of a hedge, then the system might determine that the measurement characterizes the same hedge, i.e., that the hedge has grown. Conversely, if the sensor data indicates with high probability that the object at the location corresponding to the surfel is a curb, then based on the sensor data and the dynamic nature of the object type indicated by the semantic label (i.e., hedge), the system might determine with a high probability that the environment has changed, i.e., that the hedge has been trimmed or removed.

In some instances, the semantic labels for a particular surfel and the corresponding sensor data might "agree." That is, both the semantic labels for a particular surfel and the corresponding sensor data may indicate a high likelihood that an object at a particular location is of a particular object type or has some other particular characteristic. In these examples, the label-specific detection process can result in an object prediction with high degree of probability that corresponds to the agreed-upon state of the world indicated by both the surfel map and the sensor data.

The system can perform a Bayesian update to generate the object prediction based on the surfel data and sensor data. That is, for each location represented in the surfel map, the system can determine that the semantic label(s) for the surfel corresponding to the location is a prior distribution for the object prediction, and update the associated data using the sensor data to generate the object prediction as the posterior distribution.

As a particular example, for each semantic label corresponding to a surfel, the system can update the probability associated with the semantic label using Bayes' theorem:

$$P(H \mid E) = \frac{P(E \mid H)}{P(E)} \cdot P(H),$$

where H is the class of information represented by the semantic label (e.g., whether the object at the location is vegetation) and E is the sensor data. Here, P(H) is the prior probability corresponding to the class of information in the semantic label, and P(E|H) is probability of the sensors producing that particular sensor data given that the class of information is true. Thus, P(H|E) the posterior probability for the class of information represented by the semantic label. In some implementations, the system can execute this computation independently for each class of information.

Based on performing a label-specific detection process for each surfel corresponding to the respective locations of the obtained sensor data, the system can determine whether the locations corresponding to the sensor data have changed compared to the representation of the locations in the surfel map (step 312).

If the system predicts that the environment has changed, a planned path for the vehicle can be updated based on these changes (step 314). The system can provide the object predictions generated during the label-specific detection process to a planning subsystem of the system, e.g. the planning subsystem 250 depicted in FIG. 2, and the planning subsystem can generate or update the planned path for the vehicle based on the object predictions. For example, the system can update the planned path in order to avoid obstacles that are represented in the object predictions determined from the label-specific detection process. The planning subsystem can also use the class predictions for one or more of the classes of semantic information to make autonomous driving decisions, e.g., by avoiding portions of the road surface that have a likelihood of being icy.

As a particular example, the vehicle may be on a first street and approaching a second street, and a planned path of the vehicle may instruct the vehicle to make a right turn onto the second street. The surfel map includes surfels representing a hedge on the left side of the first street, such that the hedge obstructs the sensors of the vehicle from being able to observe oncoming traffic moving towards the vehicle on the second street. Each of the surfels representing the hedge include a semantic label that labels the respective surfel as "hedge" with a high probability, indicating not only that the object is a hedge, but also that it has a low probability of permanence and is likely to change (e.g., that the hedge can grow or be trimmed back). Using this existing surfel data, before the vehicle arrives at the second street, the planned path for the vehicle may have included stopping the vehicle at particular position on the first street in order to position the sensors of the vehicle to be able observe the oncoming traffic around the hedge. However, as the vehicle approaches the second street, the sensors capture sensor data that indicates that the hedge has grown. The system can combine the surfel data with semantic labels indicating the object as "hedge" and the sensor data to generate a new object prediction for the hedge that represents its current dimensions. The planning subsystem can process the generated object prediction to update the planned path so that the vehicle can take a different particular position on the first street in order to be able to observe the oncoming traffic around the hedge.

If, based on performing a label-specific detection process for each surfel corresponding to the respective locations of the obtained sensor data, the system predicts that the environment has not changed, the previously planned path can be maintained (step 316), and the vehicle can be directed to continue following the planned path.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving a surfel map comprising a plurality of surfels, wherein:
    each surfel corresponds to a respective different location in an environment; and
    each surfel has associated data that comprises one or more semantic labels,
    wherein each semantic label represents a property of an object represented by the surfel;
  obtaining sensor data for one or more locations in the environment, the sensor data having been captured by one or more sensors of a first vehicle;
  determining one or more surfels corresponding to the one or more locations of the obtained sensor data;

identifying one or more semantic labels for the one or more surfels corresponding to the one or more locations of the obtained sensor data; and performing, for each surfel corresponding to the one or more locations of the obtained sensor data, a label-specific detection process for the surfel.

Embodiment 2 is the method of embodiment 1, wherein the one or more semantic labels identified for the one or more surfels comprise a semantic label identifying at least one of an object type, a color, a reflectivity, a permanence, or an opacity of an object represented by a respective surfel.

Embodiment 3 is the method of any of embodiments 1 or 2, wherein performing, for each surfel corresponding to the one or more locations of the obtained sensor data, a label-specific detection process for the surfel comprises: determining, based at least in part on a semantic label identifying a low probability that an object represented by a surfel at a particular location is reflective and sensor data identifying a high probability that the object at the particular location is reflective, that an object represented by the surfel is wet.

Embodiment 4 is the method of any of embodiments 1-3, wherein:

the one or more semantic labels for the one or more surfels comprise a semantic label identifying a probability that an object represented by a respective surfel is reflective; and performing, for each surfel corresponding to the one or more locations of the obtained sensor data, a label-specific detection process for the surfel comprises:

determining, based on the sensor data, that the sensor data indicates a first object type for a first object detected at a particular location;

determining, based on the surfel map, that a first semantic label for a first surfel corresponding to the particular location indicates a second object type different from the first object type;

determining that a second semantic label for a second surfel corresponding to another location proximate the particular location indicates a probability above a threshold probability that a second object represented by the second surfel is reflective; and in response to determining that the probability identified by the second semantic label is above a threshold probability, determining that the first object is of the second object type.

Embodiment 5 is the method of any of embodiments 1-4, wherein:

the one or more semantic labels for the one or more surfels comprise a semantic label identifying a probability that an object in the environment represented by a respective surfel is permanent; and performing, for each surfel corresponding to the one or more locations of the obtained sensor data, a label-specific detection process for the surfel comprises:

determining, based on comparing the one or more surfels corresponding the one or more locations of obtained sensor data to the obtained sensor data, that a representation of the object in the environment represented by the sensor data is different than a representation of the object in the surfel map;

determining that the probability identified by the semantic label that the object represented by the respective surfel is permanent is below a threshold probability; and in response to determining that the probability identified by the semantic label is below a threshold probability, updating a planned path of travel for the first vehicle in real time.

Embodiment 6 is the method of embodiment 5, further comprising in response to determining that the probability identified by the semantic label is below a threshold probability, generating an updated surfel map in real-time based on the obtained sensor data.

Embodiment 7 is the method of any of embodiments 1-6 further comprising:

determining, using a trained machine learning model, a semantic label representing a property associated with an object represented by a surfel in the surfel map; and determining, using the trained machine learning model, a probability corresponding to the semantic label, the probability indicating a likelihood that the object represented by the surfel includes the property.

Embodiment 8 is the method of embodiment 7, wherein training the machine learning module comprises:

receiving sensor data for a location in an environment, the sensor data having been captured by one or more sensors of one or more second vehicles; and receiving, from one or more users, one or more semantic labels corresponding to the sensor data, each semantic label indicating a property of an object in the location.

Embodiment 9 is a system comprising: one or more computers and one or more storage devices storing instructions that are operable, when executed by the one or more computers, to cause the one or more computers to perform the method of any one of embodiments 1-8.

Embodiment 10 is a computer storage medium encoded with a computer program, the program comprising instructions that are operable, when executed by data processing apparatus, to cause the data processing apparatus to perform the method of any one of embodiments 1-8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
receiving a surfel map comprising a plurality of surfels generated by a plurality of vehicles obtaining sensor data in a driving environment, wherein:
each surfel corresponds to a respective different location in the environment; and
each surfel has associated data that comprises one or more semantic labels, wherein each semantic label represents a property of an object represented by the surfel;
obtaining, by a first vehicle, sensor data for a first location in the environment, the sensor data having been captured by one or more sensors of the first vehicle;
obtaining, from the surfel map generated by the plurality of vehicles obtaining sensor data in the driving environment, one or more surfels corresponding to the first location of the sensor data obtained by the first vehicle;
combining, by the first vehicle, the sensor data for the first location obtained by the first vehicle with surfel data associated with the one or more surfels obtained from the surfel map generated by the plurality of other vehicles to perform a label-specific detection process for the surfel that utilizes the one or more semantic labels associated with the surfel; and
updating or maintaining a planned path of travel for the first vehicle based on an outcome of the label-specific detection process.

2. The computer-implemented method of claim 1, wherein the one or more semantic labels identified for the one or more surfels comprise a semantic label identifying at least one of an object type, a color, a reflectivity, a permanence, or an opacity of an object represented by a respective surfel.

3. The computer-implemented method of claim 1, wherein:
the one or more semantic labels for the one or more surfels comprise a semantic label identifying a probability that an object represented by a respective surfel is a particular object type;
performing, for each surfel corresponding to the one or more locations of the sensor data obtained by the first vehicle, a label-specific detection process for the surfel comprises:
determining, based on the sensor data, that the sensor data indicates a first object type for a first object detected at a particular location;
determining, based on the surfel map, that a first semantic label for a first surfel corresponding to the particular location indicates a second object type different from the first object type;
determining that a second semantic label for a second surfel corresponding to another location proximate the particular location indicates a probability that a second object represented by the second surfel is of the first object type; and
determining, based at least in part on a third semantic label identifying a high probability that the second object represented by the second surfel is dynamic, that the first object is of the first object type.

4. The computer-implemented method of claim 1, wherein:
the one or more semantic labels for the one or more surfels comprise a semantic label identifying a probability that an object represented by a respective surfel is transparent;
performing, for each surfel corresponding to the one or more locations of the sensor data obtained by the first vehicle, a label-specific detection process for the surfel comprises:
determining, based on the sensor data, that the sensor data indicates a first object type for an object detected at a particular location;
determining, based on the surfel map, that a first semantic label for a first surfel corresponding to the particular location indicates a second object type different from the first object type;
determining that a second semantic label for the first surfel corresponding to the particular location indicates a probability above a threshold probability that the object represented by the first surfel is transparent; and
in response to determining that the probability identified by the second semantic label is above the threshold probability, determining that the first object is of the second object type; and
updating or maintaining the planned path of travel for the first vehicle based on the outcome of the label-specific detection process comprises maintaining the planned path of travel for the first vehicle in response to determining that the first object is of the second object type.

5. The computer-implemented method of claim 1, wherein:
the one or more semantic labels for the one or more surfels comprise a semantic label identifying a probability that an object in the environment represented by a respective surfel is permanent; and
performing, for each surfel corresponding to the one or more locations of the sensor data obtained by the first vehicle, a label-specific detection process for the surfel comprises:
determining, based on comparing the one or more surfels corresponding to the one or more locations of the sensor data obtained by the first vehicle to the sensor data obtained by the first vehicle, that a representation of the object in the environment represented by the sensor data is different than a representation of the object in the surfel map; and
determining that the probability identified by the semantic label that the object represented by the respective surfel is permanent is above a threshold probability; and
updating or maintaining the planned path of travel for the first vehicle based on the outcome of the label-specific detection process comprises maintaining the planned path of travel for the first vehicle in real time in response to determining that the probability identified by the semantic label is above the threshold probability.

6. The computer-implemented method of claim 5, wherein the semantic label identifying a probability that an object in the environment represented by a respective surfel is permanent is a semantic label indicating an object type for the respective surfel.

7. The computer-implemented method of claim 1, wherein performing, for each surfel corresponding to the one or more locations of the obtained sensor data obtained by the first vehicle, a label-specific detection process for the surfel comprises:
  determining, using a trained machine learning model, a semantic label representing a property associated with an object represented by a surfel in the surfel map; and
  determining, using the trained machine learning model, a probability corresponding to the semantic label, the probability indicating a likelihood that the object represented by the surfel includes the property.

8. The computer-implemented method of claim 7, wherein training the machine learning module comprises:
  receiving sensor data for a location in an environment, the sensor data having been captured by one or more sensors of one or more second vehicles; and
  receiving, from one or more users, one or more semantic labels corresponding to the sensor data, each semantic label indicating a property of an object in the location.

9. A system comprising:
  one or more computers and one or more storage devices storing instructions that are operable, when executed by the one or more computers, to cause the one or more computers to perform operations comprising:
  receiving a surfel map comprising a plurality of surfels generated by a plurality of vehicles obtaining sensor data in a driving environment, wherein:
    each surfel corresponds to a respective different location in the environment; and
    each surfel has associated data that comprises one or more semantic labels, wherein each semantic label represents a property of an object represented by the surfel;
  obtaining, by a first vehicle, sensor data for a first location in the environment, the sensor data having been captured by one or more sensors of the first vehicle;
  obtaining, from the surfel map generated by the plurality of vehicles obtaining sensor data in the driving environment, one or more surfels corresponding to the first location of the sensor data obtained by the first vehicle;
  combining, by the first vehicle, the sensor data for the first location obtained by the first vehicle with surfel data associated with the one or more surfels obtained from the surfel map generated by the plurality of other vehicles to perform a label-specific detection process for the surfel that utilizes the one or more semantic labels associated with the surfel; and
  based on an outcome of the label-specific detection process, updating or maintaining a planned path of travel for the first vehicle based on a comparison of one or more surfels to sensor data obtained by the first vehicle corresponding to locations of the one or more surfels.

10. The system of claim 9, wherein the one or more semantic labels identified for the one or more surfels comprise a semantic label identifying at least one of an object type, a color, a reflectivity, a permanence, or an opacity of an object represented by a respective surfel.

11. The system of claim 9, wherein:
  the one or more semantic labels for the one or more surfels comprise a semantic label identifying a probability that an object represented by a respective surfel is a particular object type;
  performing, for each surfel corresponding to the one or more locations of the obtained sensor data obtained by the first vehicle, a label-specific detection process for the surfel comprises:
    determining, based on the sensor data, that the sensor data indicates a first object type for a first object detected at a particular location;
    determining, based on the surfel map, that a first semantic label for a first surfel corresponding to the particular location indicates a second object type different from the first object type;
    determining that a second semantic label for a second surfel corresponding to another location proximate the particular location indicates a probability that a second object represented by the second surfel is of the first object type; and
    determining, based at least in part on a third semantic label identifying a high probability that the second object represented by the second surfel is dynamic, that the first object is of the first object type.

12. The system of claim 9, wherein:
  the one or more semantic labels for the one or more surfels comprise a semantic label identifying a probability that an object represented by a respective surfel is transparent;
  performing, for each surfel corresponding to the one or more locations of the obtained sensor data obtained by the first vehicle, a label-specific detection process for the surfel comprises:
    determining, based on the sensor data, that the sensor data indicates a first object type for an object detected at a particular location;
    determining, based on the surfel map, that a first semantic label for a first surfel corresponding to the particular location indicates a second object type different from the first object type;
    determining that a second semantic label for the first surfel corresponding to the particular location indicates a probability above a threshold probability that the object represented by the first surfel is transparent; and
    in response to determining that the probability identified by the second semantic label is above the threshold probability, determining that the first object is of the second object type; and
  updating or maintaining the planned path of travel for the first vehicle based on the outcome of the label-specific detection process comprises maintaining the planned path of travel for the first vehicle in response to determining that the first object is of the second object type.

13. The system of claim 9, wherein:
  the one or more semantic labels for the one or more surfels comprise a semantic label identifying a probability that an object in the environment represented by a respective surfel is permanent; and
  performing, for each surfel corresponding to the one or more locations of the sensor data obtained by the first vehicle, a label-specific detection process for the surfel comprises:
    determining, based on comparing the one or more surfels corresponding to the one or more locations of the sensor data obtained by the first vehicle to the sensor data obtained by the first vehicle, that a representation of the object in the environment represented by the sensor data is different than a representation of the object in the surfel map; and
    determining that the probability identified by the semantic label that the object represented by the respective surfel is permanent is above a threshold probability; and updating or maintaining the planned path of travel for the first vehicle based on the outcome of the label-specific detection process comprises maintaining the planned path of travel for the first vehicle in real time in response to determining that the probability identified by the semantic label is above the threshold probability.

14. The system of claim 9, wherein performing, for each surfel corresponding to the one or more locations of the sensor data obtained by the first vehicle, a label-specific detection process for the surfel comprises:
   determining, using a trained machine learning model, a semantic label representing a property associated with an object represented by a surfel in the surfel map; and
   determining, using the trained machine learning model, a probability corresponding to the semantic label, the probability indicating a likelihood that the object represented by the surfel includes the property.

15. One or more non-transitory computer storage media encoded with computer program instructions that when executed by one or more computers cause the one or more computers to perform operations comprising:
   receiving a surfel map comprising a plurality of surfels generated by a plurality of vehicles obtaining sensor data in a driving environment, wherein:
      each surfel corresponds to a respective different location in the environment; and
      each surfel has associated data that comprises one or more semantic labels, wherein each semantic label represents a property of an object represented by the surfel;
   obtaining, by a first vehicle, sensor data for a first location in the environment, the sensor data having been captured by one or more sensors of the first vehicle;
   obtaining, from the surfel map generated by the plurality of vehicles obtaining sensor data in the driving environment, one or more surfels corresponding to the first location of the obtained sensor data obtained by the first vehicle;
   combining, by the first vehicle, the sensor data for the first location obtained by the first vehicle with surfel data associated with the one or more surfels obtained from the surfel map generated by the plurality of other vehicles to perform a label-specific detection process for the surfel that utilizes the one or more semantic labels associated with the surfel; and
   updating or maintaining a planned path of travel for the first vehicle based on an outcome of the label-specific detection process.

16. The one or more non-transitory computer storage media of claim 15, wherein the one or more semantic labels identified for the one or more surfels comprise a semantic label identifying at least one of an object type, a color, a reflectivity, a permanence, or an opacity of an object represented by a respective surfel.

17. The one or more non-transitory computer storage media of claim 15, wherein:
   the one or more semantic labels for the one or more surfels comprise a semantic label identifying a probability that an object represented by a respective surfel is a particular object type;
   performing, for each surfel corresponding to the one or more locations of the sensor data obtained by the first vehicle, a label-specific detection process for the surfel comprises:
      determining, based on the sensor data, that the sensor data indicates a first object type for a first object detected at a particular location;
      determining, based on the surfel map, that a first semantic label for a first surfel corresponding to the particular location indicates a second object type different from the first object type;
      determining that a second semantic label for a second surfel corresponding to another location proximate the particular location indicates a probability that a second object represented by the second surfel is of the first object type; and
      determining, based at least in part on a third semantic label identifying a high probability that the second object represented by the second surfel is dynamic, that the first object is of the first object type.

18. The one or more non-transitory computer storage media of claim 15, wherein:
   the one or more semantic labels for the one or more surfels comprise a semantic label identifying a probability that an object represented by a respective surfel is transparent;
   performing, for each surfel corresponding to the one or more locations of the sensor data obtained by the first vehicle, a label-specific detection process for the surfel comprises:
      determining, based on the sensor data, that the sensor data indicates a first object type for an object detected at a particular location;
      determining, based on the surfel map, that a first semantic label for a first surfel corresponding to the particular location indicates a second object type different from the first object type;
      determining that a second semantic label for the first surfel corresponding to the particular location indicates a probability above a threshold probability that the object represented by the first surfel is transparent; and
      in response to determining that the probability identified by the second semantic label is above the threshold probability, determining that the first object is of the second object type; and
   updating or maintaining the planned path of travel for the first vehicle based on the outcome of the label-specific detection process comprises maintaining the planned path of travel for the first vehicle in response to determining that the first object is of the second object type.

19. The one or more non-transitory computer storage media of claim 15, wherein:
   the one or more semantic labels for the one or more surfels comprise a semantic label identifying a probability that an object in the environment represented by a respective surfel is permanent; and
   performing, for each surfel corresponding to the one or more locations of the sensor data obtained by the first vehicle, a label-specific detection process for the surfel comprises:
      determining, based on comparing the one or more surfels corresponding to the one or more locations of the sensor data obtained by the first vehicle to the sensor data obtained by the first vehicle, that a representation of the object in the environment represented by the sensor data is different than a representation of the object in the surfel map; and
      determining that the probability identified by the semantic label that the object represented by the respective surfel is permanent is above a threshold probability; and updating or maintaining the planned path of travel for the first vehicle based on the outcome of the label-specific detection process comprises maintaining the planned path of travel for the first vehicle in real time in response to determining that the probability identified by the semantic label is above the threshold probability.

20. The one or more non-transitory computer storage media of claim 15, wherein performing, for each surfel corresponding to the one or more locations of the sensor data obtained by the first vehicle, a label-specific detection process for the surfel comprises:
  determining, using a trained machine learning model, a semantic label representing a property associated with an object represented by a surfel in the surfel map; and
  determining, using the trained machine learning model, a probability corresponding to the semantic label, the probability indicating a likelihood that the object represented by the surfel includes the property.

21. The computer-implemented method of claim 1, wherein combining, by the first vehicle, the sensor data for the first location obtained by the first vehicle with surfel data associated with the one or more surfels obtained from the surfel map generated by the plurality of other vehicles comprises updating a probability (P(H)) associated with a semantic label associated with a surfel for a particular location according to:

$$P(H \mid E) = \frac{P(E \mid H)}{P(E)} \cdot P(H),$$

where H is a class of information represented by the semantic label associated with the surfel and E is the sensor data for the particular location obtained by the first vehicle.

\* \* \* \* \*